United States Patent
Swanson et al.

(10) Patent No.: US 9,629,299 B2
(45) Date of Patent: Apr. 25, 2017

(54) FRONT ATTACHMENT CONTROL SYSTEM

(71) Applicant: Deere & Company, Moline, IL (US)

(72) Inventors: Larry D. Swanson, Horicon, WI (US); Daniel Knight, Lexington, KY (US)

(73) Assignee: DEERE & COMPANY, Moline, IL (US)

( * ) Notice: Subject to any disclaimer, the term of this patent is extended or adjusted under 35 U.S.C. 154(b) by 107 days.

(21) Appl. No.: 14/451,832

(22) Filed: Aug. 5, 2014

(65) Prior Publication Data
US 2016/0040395 A1 Feb. 11, 2016

(51) Int. Cl.
| | |
|---|---|
| A01B 63/108 | (2006.01) |
| E02F 9/22 | (2006.01) |
| E02F 3/36 | (2006.01) |
| E02F 3/76 | (2006.01) |
| E02F 9/20 | (2006.01) |
| E01H 5/09 | (2006.01) |

(52) U.S. Cl.
CPC .......... A01B 63/108 (2013.01); E02F 3/3677 (2013.01); E02F 3/7631 (2013.01); E02F 9/2012 (2013.01); E02F 9/2267 (2013.01); E01H 5/098 (2013.01)

(58) Field of Classification Search
USPC .......................................................... 37/407
IPC ...... A01B 63/10,63/1006, 63/108; E02F 3/844 , 9/2264, 9/2267
See application file for complete search history.

(56) References Cited

U.S. PATENT DOCUMENTS

| | | | | | |
|---|---|---|---|---|---|
| 3,700,044 | A | * | 10/1972 | Berg | E02F 3/844 137/636.2 |
| 3,795,280 | A | * | 3/1974 | Casey | B62D 11/183 172/812 |
| 5,346,018 | A | * | 9/1994 | Koster | A01B 59/00 172/125 |
| 5,678,470 | A | * | 10/1997 | Koehler | E02F 9/2025 60/327 |
| 5,692,541 | A | * | 12/1997 | Brown | F15B 13/0422 137/636.1 |
| 5,701,793 | A | * | 12/1997 | Gardner | E02F 3/431 60/327 |
| 6,185,493 | B1 | * | 2/2001 | Skinner | E02F 3/432 701/50 |
| 6,732,811 | B1 | | 5/2004 | Elliot | |
| 7,063,169 | B2 | * | 6/2006 | Elliott | A01B 59/068 172/445.1 |
| 8,700,271 | B2 | * | 4/2014 | Evenson | E02F 3/844 172/812 |

* cited by examiner

Primary Examiner — Gary Hartmann

(57) ABSTRACT

A front attachment control system includes a selective control valve controlled by a joystick in a utility vehicle operator station, a diverter valve connected to the selective control valve and having a diverter switch that switches the diverter valve between a first position for an attachment tilt function and a second position for an attachment angling function controlled by the joystick. A front attachment with an angling cylinder includes a pair of hydraulic lines connectable to the diverter valve, and an actuator that engages the diverter switch as the hydraulic lines are connected to the diverter valve to switch the diverter valve to the second position.

6 Claims, 5 Drawing Sheets

FRONT ATTACHMENT CONTROL SYSTEM

FIELD OF THE INVENTION

This invention relates to front attachments for utility vehicles and other off road machines. More specifically, the invention relates to front attachment control systems for lifting, tilting or angling front attachments.

BACKGROUND OF THE INVENTION

Utility vehicles and other off road machines may be equipped with various front attachments or implements such as loader buckets and pallet forks that use hydraulic cylinders to perform lift and tilt functions. Other front attachments including snow blowers, blades and rotary brooms use hydraulic cylinders for angling instead of the tilt function. Some front attachments also may be powered by a power take off (PTO).

Utility vehicles may include a joystick to operate a selective control valve (SCV) to extend or retract a hydraulic lift cylinder and hydraulic tilt cylinder. An operator may move the joystick fore and aft to extend and retract the lift cylinder, and left to right to extend and retract the tilt cylinder. Some utility vehicles also include a tilt lockout switch adjacent the joystick. The tilt lockout switch may automatically activate when operating PTO driven attachments, or may be activated by the operator to lock out the tilt function. Additionally, an auxiliary hydraulic switch adjacent the joystick may be used by the operator to extend or retract a hydraulic angling cylinder on front attachments that require angling instead of tilting.

However, if the operator does not lockout the tilt function before the tilt cylinder is extended or retracted, this can result in potential damage to the attachment or front PTO. Additionally, it may be difficult for operators to control a front implement using a joystick and auxiliary switch at the same time.

A front attachment control system is needed that can use the joystick for lift, tilt and angling functions. A front attachment control system is needed that reduces or eliminates the risk of damage to attachments and PTO shafts when using front attachments that require angling instead of tilting. A front attachment control system is needed that is ergonomic to operate when using various different attachments.

SUMMARY OF THE INVENTION

A front attachment control system includes a diverter valve and a diverter switch on the front of a utility vehicle. A front attachment includes an angling cylinder and an actuator for the diverter switch when the front attachment is connected to the front hitch. The diverter switch moves the diverter valve from a first position operating a tilt cylinder to a second position operating the angling cylinder.

The front attachment control system can use the joystick for lift, tilt and angling functions, and reduces or eliminates the risk of damage to attachments and PTO shafts when using front attachments that require angling instead of tilting. The system also is ergonomic to operate with different attachments.

DESCRIPTION OF THE PREFERRED EMBODIMENT

Figure 1:
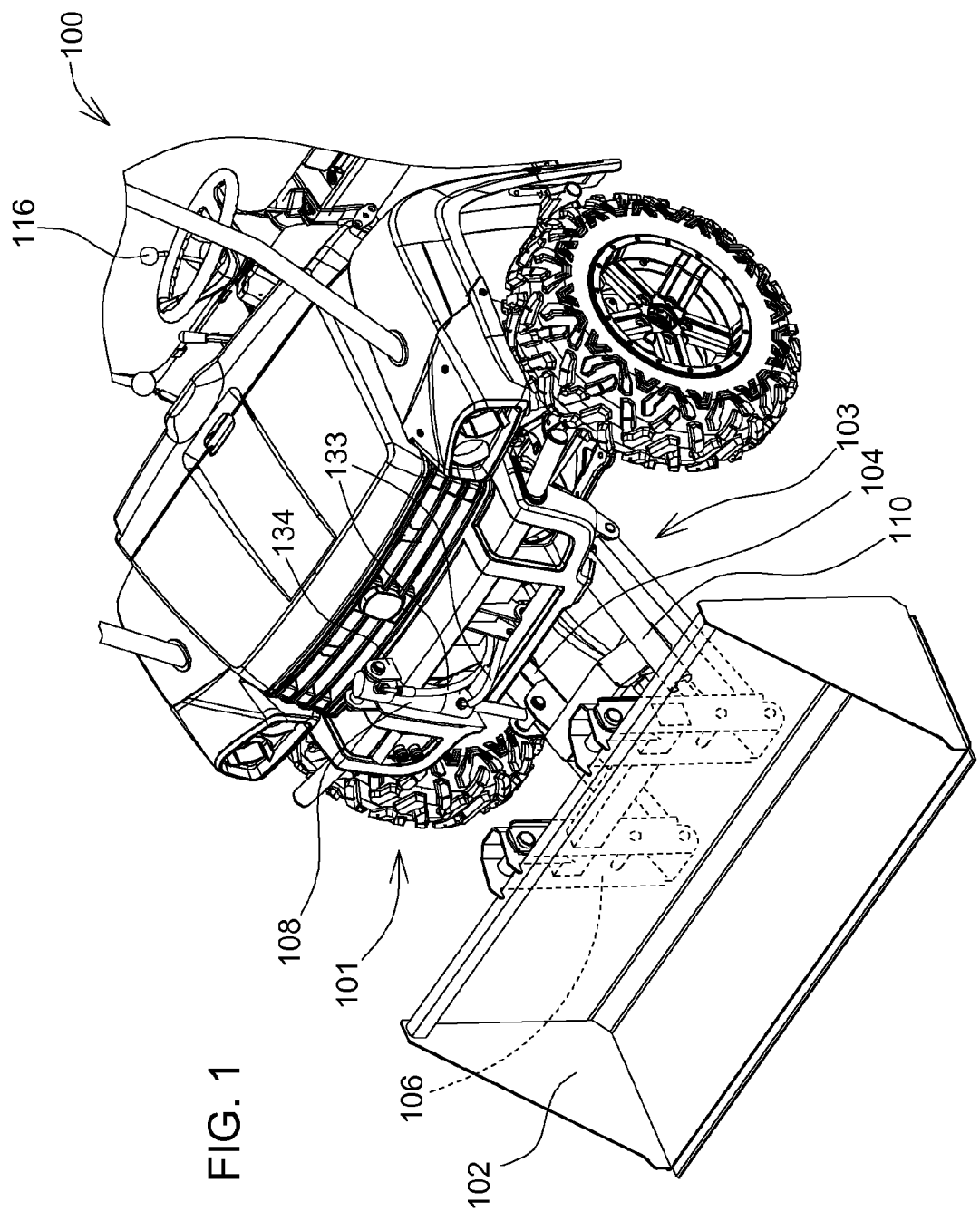
FIG. 1 is a perspective view of the front of a utility vehicle with a loader bucket attached using the front attachment control system according to a preferred embodiment of the invention.
Figure 2:
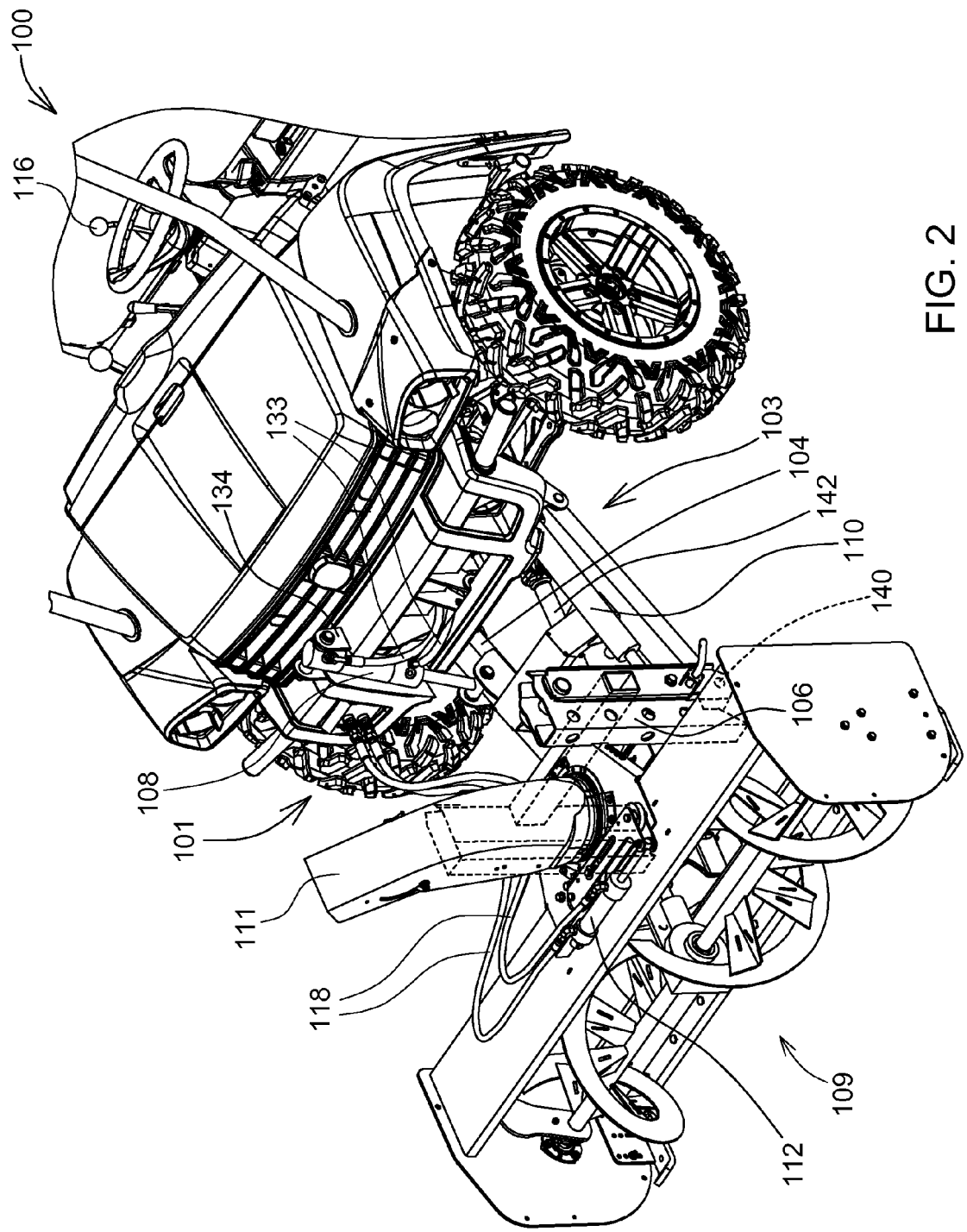
FIG. 2 is a perspective view of the front of a utility vehicle with a snow blower attached using the front attachment control system according to a preferred embodiment of the invention.
Figure 3:
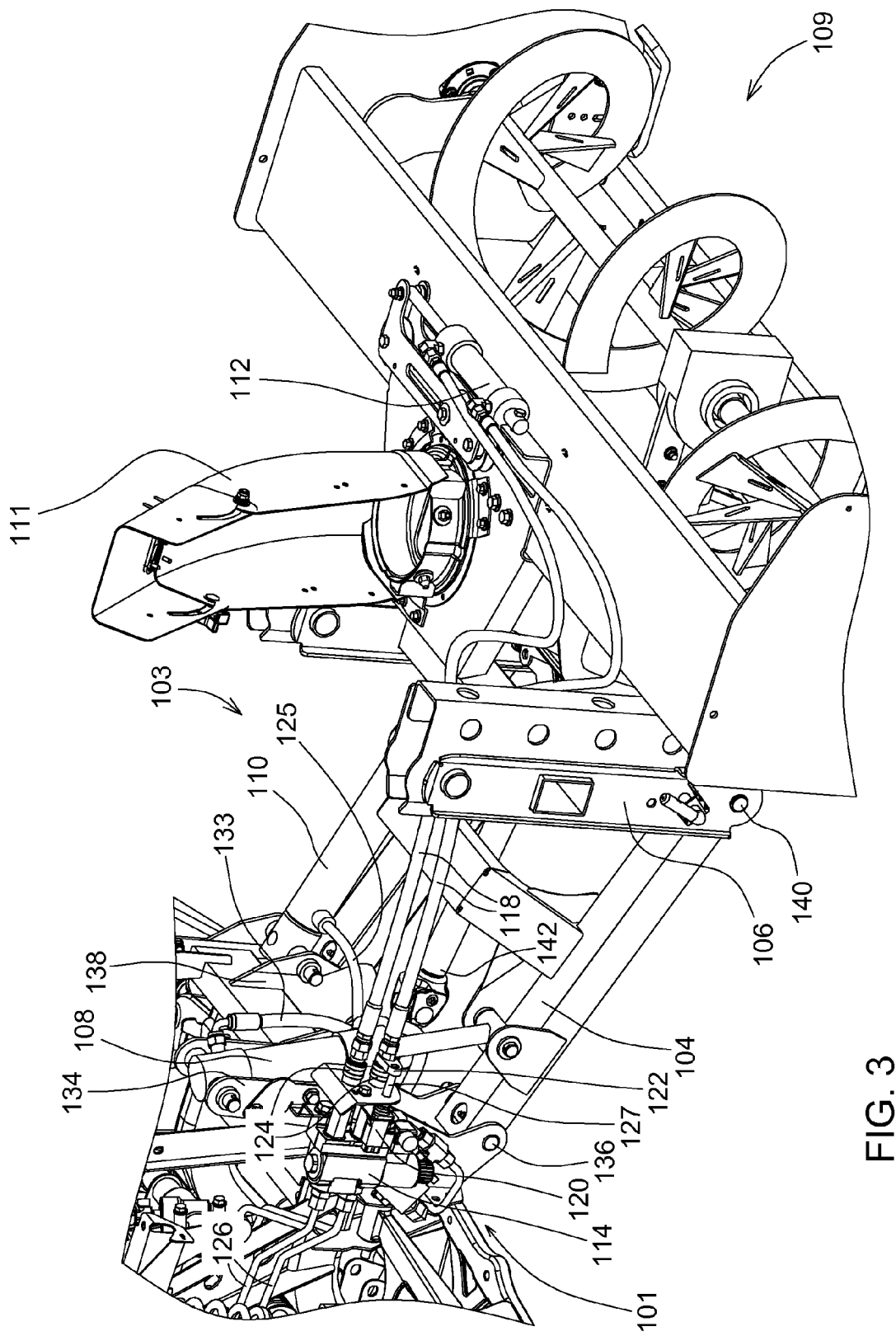
FIG. 3 is a perspective view of a front attachment control system with a snow blower having the angling function, according to a preferred embodiment of the invention.

In the embodiment shown in FIGS. 1-2, utility vehicle 100 is shown having front attachment control system 101. The utility vehicle may be any off road or work vehicle equipped with front hitch 103 at the front of the vehicle, including recreational vehicles, but the invention also may be used on work vehicles such as small tractors. The utility vehicle's front hitch 103 may include lift frame 104, tilt frame 106, hydraulic lift cylinder 108 and hydraulic tilt cylinder 110. The hydraulic lift cylinder may be connected between lift frame 104 and lift arm 134, and may pivot on a generally horizontal lift pivot axis 136 as shown in FIG. 3. The hydraulic tilt cylinder may be connected between tilt frame 106 and tilt arm 138 shown in FIG. 3, and may pivot on a generally horizontal tilt pivot axis 140.

In the embodiment of FIG. 1, loader bucket 102 is installed on the front hitch of the utility vehicle. Front attachments or implements such as loader buckets and pallet forks may be lifted and tilted during their use. In the embodiment of FIG. 2, snow blower 109 is installed on the front hitch. Front attachments or implements such as snow blowers, blades and brooms may be lifted and also have an angling function instead of a tilt function. Additionally, front attachments or implements such as a snow blower or rotary broom may be driven by a front power take off shaft (PTO) 142.

As shown in FIG. 2, hydraulic angling cylinder 112 may be mounted to a front attachment or implement, such as snow blower 109. For example, hydraulic angling cylinder 112 may be configured to pivot the implement itself or a portion of the implement such as the snow blower discharge chute 111.

Figure 4:
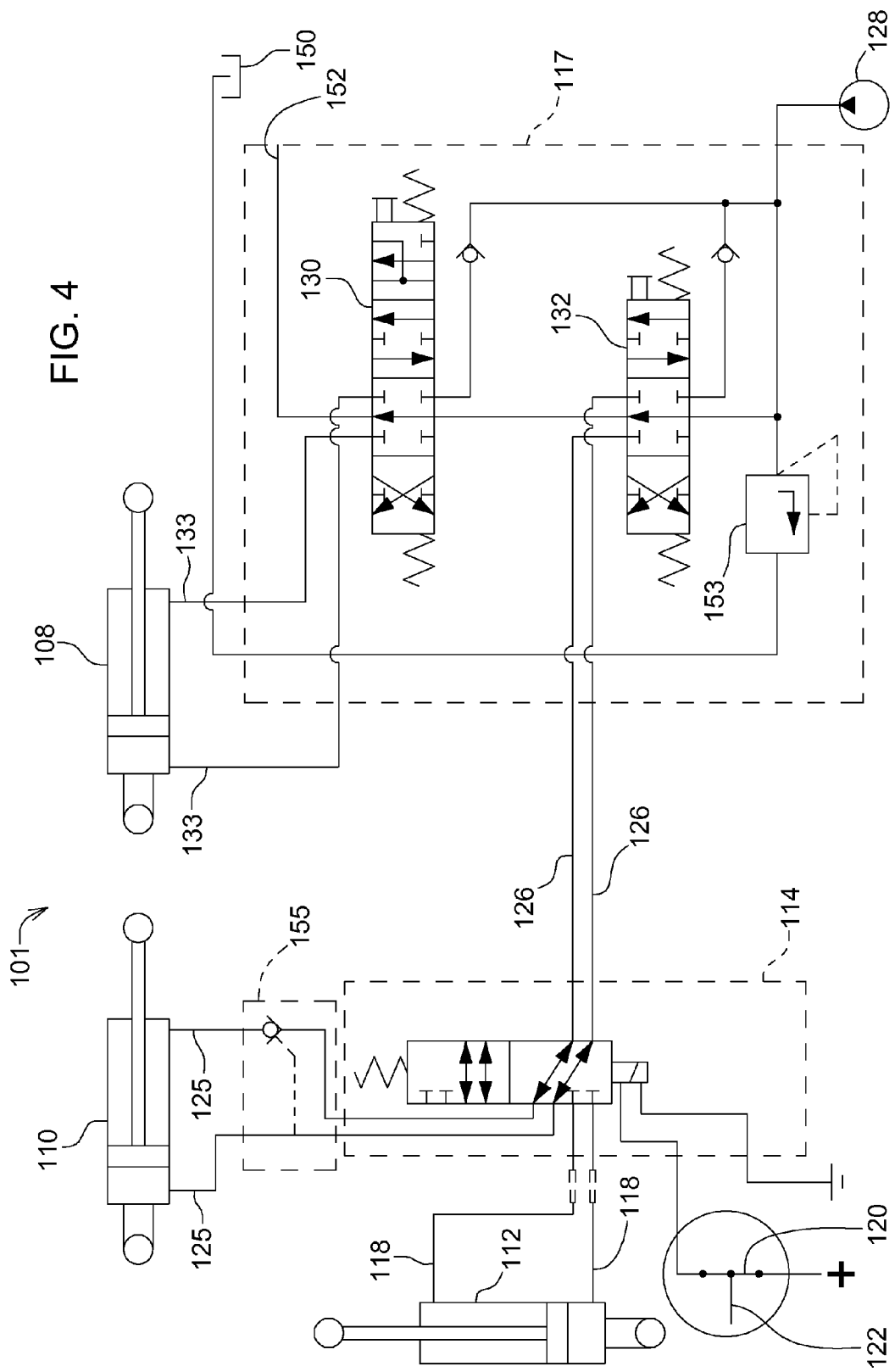
FIG. 4 is a schematic diagram of a hydraulic circuit of a front attachment control system that directs hydraulic fluid to the tilt cylinder according to a preferred embodiment of the invention.
Figure 5:
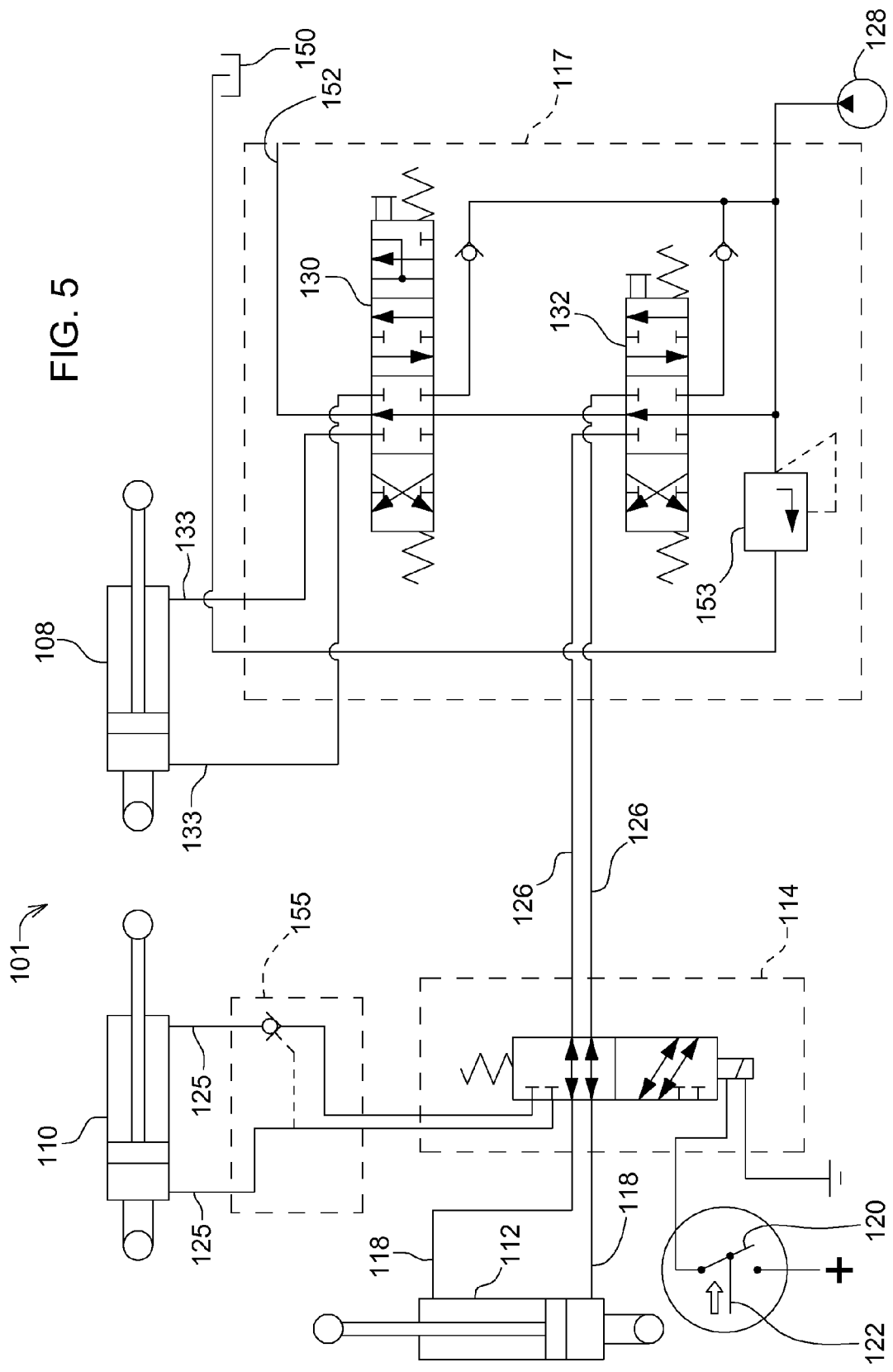
FIG. 5 is a schematic diagram of a hydraulic circuit of a front attachment control system that directs hydraulic fluid to the angling cylinder according to a preferred embodiment of the invention.

Now referring to FIG. 3, one embodiment of the front attachment control system 101 is shown in more detail. Front attachment control system 101 may include diverter valve 114, diverter switch 120, and diverter switch actuator 122. Diverter valve 114 may be a hydraulic valve mounted at the front of the utility vehicle, such as on or adjacent front hitch 103, and may have a pair of ports 124 for connecting hydraulic lines 118 of a front attachment with an angling function such as snow blower 109. For example, hydraulic quick couplers may be used to connect hydraulic lines 118 to ports 124 of diverter valve 114. Diverter valve 114 also may be connected by hydraulic lines 125 to tilt cylinder 110, and hydraulic lines 126 from SCV valve 117 as shown in FIGS. 4-5.

In one embodiment, diverter valve 114 may move to either a first or tilt position, or a second or angling position. FIG. 4 shows diverter valve 114 in a first or tilt position directing hydraulic fluid to tilt cylinder 110. FIG. 5 shows diverter valve 114 in a second or angling position directing hydraulic fluid to angling cylinder 112. In the second or angling position, the front attachment control system may lock the tilt cylinder to prevent inadvertent actuation of the tilt cylinder. Pilot check valve 155 may be provided in the hydraulic lines to the tilt cylinder.

In the embodiment of FIG. 3, diverter valve 114 may be actuated electrically by diverter switch 120, to move the diverter valve to either the first or tilt position or the second or angling position. Diverter switch 120 may be a push button switch in an electrical circuit connected to diverter valve 114. For example, FIG. 4 shows diverter switch 120 closed with the diverter valve in the first or tilt position, and FIG. 5 shows diverter switch 120 open with the diverter valve in the second or angling position.

In one embodiment, actuator 122 may contact and engage diverter switch 120 when hydraulic lines 118 are connected to the diverter valve of the front attachment control system. Actuator 122 may be positioned on or adjacent hydraulic lines 118. When hydraulic lines 118 are connected, actuator 122 may contact and engage diverter switch 120, causing the switch to open and the diverter valve to move to the second or angling position. For example, actuator 122 may include actuator pin 127 that may be guided through a hole or slot into contact with diverter switch 120. When hydraulic lines 118 are disconnected from the diverter valve, actuator 122 is out of contact with diverter switch 120 and does not engage the diverter switch, so the diverter switch may close and the diverter valve may be biased to return to the first or tilt position.

Alternatively, the front attachment control system of the present invention also may use various different actuators to actuate a diverter switch and move diverter valve 114 from the first or tilt position to the second or angling position. For example, other actuators for the diverter switch may include electrical sensors that detect hydraulic lines on a front implement having the angling function, and actuate the diverter switch. The front attachment control system contemplates any type of sensor providing a signal to a diverter switch and diverter valve when a front attachment or implement with the angling function is installed on the front hitch of a utility vehicle.

Now referring to 4-5, in one embodiment, front attachment control system 101 may include SCV valve 117. SCV valve 117 may have first spool valve 130 directing hydraulic fluid to hydraulic lift cylinder 108 through hydraulic lines 133, and second spool valve 132 directing hydraulic fluid to diverter valve 114 through hydraulic lines 126, which then directs hydraulic fluid to either the tilt cylinder 110 or angling cylinder 112. FIG. 4 shows diverter valve 114 directing hydraulic fluid to tilt cylinder 110, and FIG. 5 shows diverter valve 114 directing hydraulic fluid to angling cylinder 112. SCV valve 117 may be operated using joystick 116 in the operator station of the utility vehicle as shown in FIGS. 1-2, which the operator may move fore and aft for the lift cylinder, and left to right for either the tilt cylinder or angling cylinder. Thus, the operator may use the same joystick for tilt and angling functions, as well as the lift function. SCV valve 117 also may be connected to hydraulic pump 128, tank or sump 150, and power beyond port 152. SCV valve 117 also may include pressure relief valve 153.

Having described the preferred embodiment, it will become apparent that various modifications can be made without departing from the scope of the invention as defined in the accompanying claims.

The invention claimed is:

1. A front attachment control system, comprising:
    a diverter valve and a diverter switch on a front of a utility vehicle; the diverter valve actuated by the diverter switch to move between a first position opening a pair of hydraulic lines connected to a tilt cylinder and a second position opening a pair of hydraulic lines connected to an angling cylinder; and
    an actuator on a hydraulic line of a front attachment and having an actuator pin that is positioned to engage the diverter switch when the hydraulic line on the front attachment is connected to the diverter valve.

2. The front attachment control system of claim 1 further comprising a selective control valve connected to the diverter valve that directs hydraulic flow to a lift cylinder and the tilt cylinder or the angling cylinder based on the position of an operator controlled joystick.

3. The front attachment control system of claim 1 further comprising a power take off connected to the front attachment.

4. A front attachment control system on a utility vehicle, comprising:
    a front attachment having hydraulic lines connected to an angling cylinder; and
    a hydraulic circuit on the utility vehicle having hydraulic lines connected to a lift cylinder, hydraulic lines connected to a tilt cylinder, and a diverter switch that actuates a valve closing the hydraulic lines connected to the tilt cylinder and opening the hydraulic lines connected to the angling cylinder when an actuator on the hydraulic lines of the front attachment engages the diverter switch.

5. The front attachment control system of claim 4 wherein the hydraulic circuit includes a selective control valve operated by a joystick, and a diverter valve actuated by the diverter switch.

6. The front attachment control system of claim 5 wherein the diverter valve is mounted adjacent a front hitch of a utility vehicle.

* * * * *